Jan. 9, 1968  C. O. SWANSON ET AL  3,362,232
COMPACT, SINGLE-DEGREE-OF-FREEDOM GYRO
Filed Dec. 27, 1963  5 Sheets-Sheet 1

CLIFFORD O. SWANSON
ROBERT J. COHEN
INVENTORS

BY George B. Oujevolk
ATTORNEY

CLIFORD O. SWANSON
ROBERT J. COHEN
INVENTORS

CLIFORD O. SWANSON
ROBERT J. COHEN
INVENTORS

Jan. 9, 1968   C. O. SWANSON ET AL   3,362,232
COMPACT, SINGLE-DEGREE-OF-FREEDOM GYRO
Filed Dec. 27, 1963   5 Sheets-Sheet 4

CLIFORD O. SWANSON
ROBERT J. COHEN
INVENTORS

BY *George B. Oujevolk*

ATTORNEY

CLIFFORD O. SWANSON
ROBERT J. COHEN
INVENTORS

ATTORNEY

United States Patent Office 3,362,232
Patented Jan. 9, 1968

3,362,232
COMPACT, SINGLE-DEGREE-OF-FREEDOM GYRO
Clifford O. Swanson, Little Falls, and Robert J. Cohen, Wyckoff, N.J., assignors to General Precision Inc., Little Falls, N.J., a corporation of Delaware
Filed Dec. 27, 1963, Ser. No. 333,944
11 Claims. (Cl. 74—5.6)

This application is a continuation-in-part of Robert J. Cohen patent applications, Ser. No. 234,706 filed Nov. 1, 1962, now U.S. Patent No. 3,208,288, and Ser. No. 222,567 filed Sept. 10, 1962, now U.S. Patent No. 3,154,952.

The present invention relates to miniature floated rate integrating gyros, and more particularly to small compact, single-degree-of-freedom, miniature and subminiature floated rate integrating gyros.

In space and missile navigation, extremely small gyros are required. These gyros are called miniature and subminiature gyros. Into a small gyro package must be placed a gyro wheel, various pickoffs to sense displacement, torquers to adjust position and associated electronics. Heretofore, these gyros were assembled by watchmaking techniques, each package being individually assembled, tested, reopened, adjusted, retested, etc. The production of these extremely small gyros was slow, on an individual basis and not on any mass production technique. The wires and components were therefore not uniformly placed in all gyros. Also, in such a small package, it is extremely difficult to determine the strength and effect of all stray electric and magnetic fields. The fact that these fields interact further complicates the problem. A good deal of electrical inputs are fed into the gyro, to run the gyro wheel motor, for pickoffs, torquers, magnets, etc. Each of these components must perform its function without interference from its neighbor. Also, it is necessary that the gyros be uniform insofar as the internal disposition of the electrical wiring is concerned so that when adjustments and repairs are made, the repair technician does not have to search around for the proper lead wires. A gyro should have a minimum of mechanical parts, and the mechanical and electrical components should be disposed so that they are adjustable or repairable.

In accordance with the present invention, the coils of the pickoff are located outside of the gyro fluid compartment where they are not hindered by the flotation fluid and can be readily adjusted relative to the rotor coils to provide an optimum null position. Also, the number of flexleads is kept to a minimum by having the same flexleads serve both torquer coils and the pickoff coils. At the same time the flexleads are so disposed as to be shielded from stray magnetic fields and the torquer rotor cup is made of a particular inert material herein described to further prevent stray magnetic fields from affecting the components.

Therefore, an object of the present invention is to provide a small compact single-degree-of-freedom gyro.

Another object of the present invention is to provide a floated gyro wherein the pickoff coils are located outside the gyro fluid compartment.

Still another object of the present invention is to provide a gyro wherein the same lead will serve a plurality of components.

Yet another object of the present invention relates to the use of a torquer rotor cup of particular inert material.

The invention as well as its many objects and advantages will become more apparent from the following description taken in conjunction with the accompanying drawing in which.

In the gyro of the present invention almost all major components are located towards one end of the gyro in a components section. The electrical and magnetic elements are so disposed in this section that the respective fields of each component do not interact with the fields of other components of the gyro. Broadly stated, the present invention contemplates placing the gyro flexleads within the flotation fluid on a support at a central axial location where they can be readily reached for adjustment and repair. This support is shielded from magnetic fields by a circular inner cup-shaped magnetic return path. Surrounding this inner magnetic return path is a rotor having imbedded therein two sets of arcuately disposed coils, one set being used as pickoff rotor coils requiring an AC excitation; the other set is used as rotor torquer coils and requires a DC excitation. The same sets of flexleads are used to supply the excitation in connection with both sets of coils, the AC and DC being supplied through the same flexleads. Disposed about the rotor is a fluid cylindrical seal. On the other side of this seal and outside the fluid is the stator in which a pair of pickoff stator coils are disposed opposite the pickoff rotor coils and two magnet sets are located opposite the torquer coils. Each magnet set has individual north and south pole magnets and the poles are coupled by an outer return path. The poles of each magnet set are so disposed that they span the arc of the torquer coil. The active portion of the torquer coil is centrally located in the arc defined by the magnet pole faces.

Figure 1:
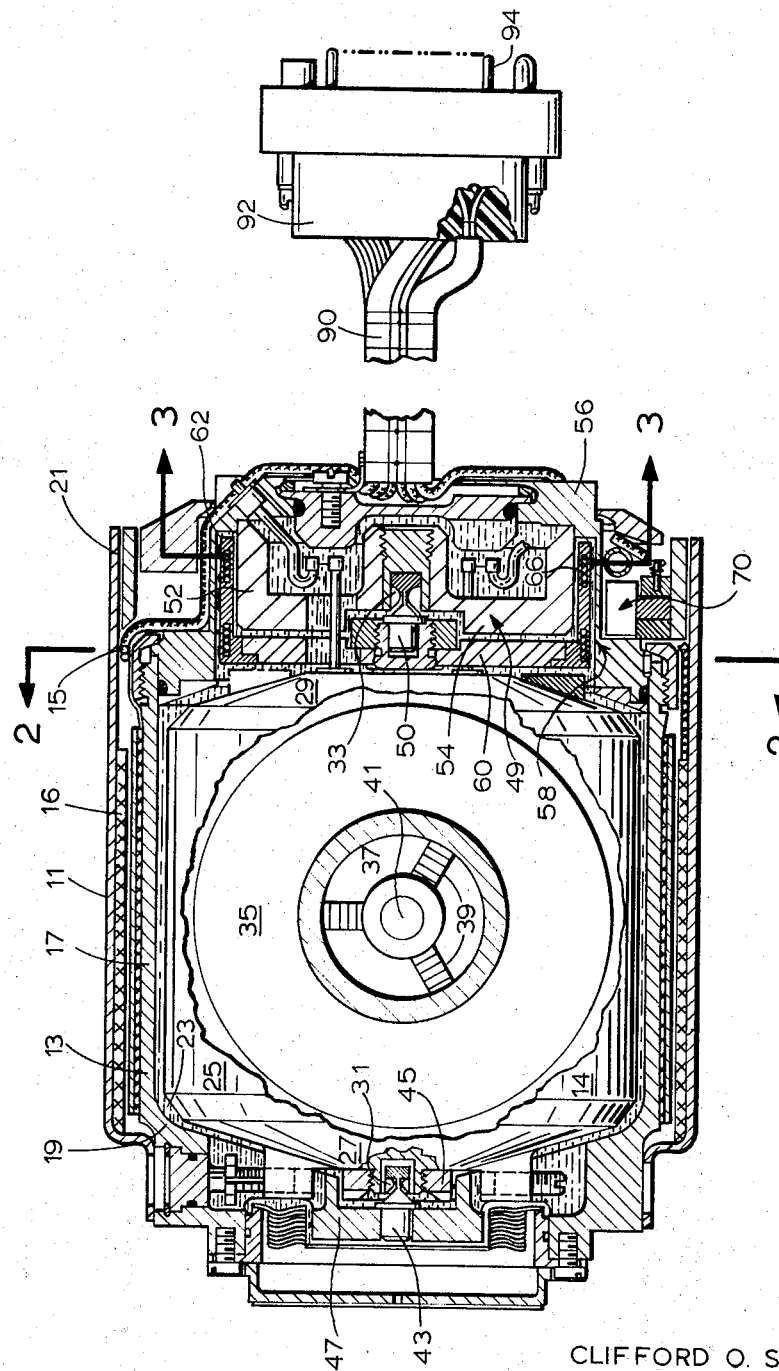
FIGURE 1 is a longitudinal sectional view of a gyro contemplated herein.

In accordance with the foregoing concept, there is shown in FIGURE 1 a floated rate integrating gyro of the type contemplated herein. This gyro is covered by an outer cylindrical shield 11 disposed over and coaxial with a cylindrical housing 13. Space is provided between the shield and housing for the passage of heater wires 15 leading to a heater 16 which surrounds the housing. The housing includes a central body section 17, an end section 19, and a components section 21. Within the housing 13 is a viscous damping flotation fluid and a floated cylindrical gyro case 25 having frusto-conical ends 27 and 29. The case is disposed for rotation on jewel bearings 31 and 33 giving to this gyro its single degree of freedom. Within the case is a gyro wheel 35 whose spin axis is at right angles to the cylindrical axis of the shield, housing, and case. The gyro wheel is rotated by the action of a motor stator 37 with field windings 39. The gyro wheel 35 is mounted for rotation on a gyro axle 41 fastened to the gyro case. The jewel bearings 31 and 33 are disposed at one and the other end of the gyro case. Bearing 31 journals a stub shaft 43 fixed to the end section of housing 13. The shaft is mounted within a bearing ring 45 floated in a cup-shaped member 47. At the other end of the gyro case, bearing 33 is fixed within a cup-shaped inner magnetic return path 49 and journals a stub shaft 50. The cup-shaped inner magnetic return path 49 has a cylindrical wall 52 and a circular bottom wall 54. Cylindrical wall 52 is fixed within an end cover 56 which closes the components section of the housing. End cover 56 has a thin cylindrical fluid seal outer wall 58 which closes off the body section 17 of the housing containing the flotation fluid for the gyroscope. Fitted to gyro case 25 in the components section of the housing is a cup-shaped rotor 60 for rotation with the case. The rotor has a thin cylindrical wall 62 positioned in the space between the fluid seal wall 58 and the cylindrical wall 52 of the magnetic return path 49. Two groups of coils are imbedded in the cylindrical wall 62 of the rotor. A pair of pickoff rotor coils 64 and 66 are disposed so as to have the same common axis extending perpendicularly through the output axis of the gyroscope, these pick-off rotor coils are angularly displaced in response to angular displacement of the gyro wheel case 25 about the gyroscope output axis; and, a pair of torquer coils 110 and 112 are disposed in quadrature with the pickoff rotor coils.

Pickoffs 68 and 70 responsive to pickoff rotor coils 64 and 66 are positioned outside of the fluid seal wall 58 opposite the pickoff rotor coils 64 and 66, respectively, to detect any angular displacement of the pickoff rotor coils in the rotor. Each pickoff comprises a laminated core having spaced legs 72 and 74 with pickoff stator coils 76 and 78 wound about each leg. These pickoff stator coils are connected in phase opposition so that the magnetic flux is additive in each core. Each core is supported on an arcuate base 80 having slots 82 and 84 in the ends thereof, the base being adjustably mounted on a radial wall of end cover 56 by a pair of screws 86 and 88.

The torquer consists of an outer return path 107 and two magnet sets, each set having two permanent magnets connected by a return path. Thus, two magnets, 109 and 111, form a set connected by outer return path 107. Magnets 113 and 115 form another pair connected by the outer return path. Opposite each are torquer coils 110 and 112. The magnetic circuit is completed by inner return path 49.

The necessary electrical connections to the gyro are made by a plurality of wires which project from the end cover 56 and form a cable 90 having a male plug 92 on the end thereof. A plurality of prongs 94 projecting from the plug 92 are electrically connected to different wires. The pickoff stator coils 76 and 78 of each pickoff 68 and 70 are connected to a source of alternating current by means of the plug 92 so as to produce an alternating magnetic flux which links the pickoff cores which links the pickoff rotor coils 64 and 66, the magnetic return path 49 intensifying the magnetic flux linking the rotor coils. With the pickoff rotor coils centered between the two legs, the magnetic flux from each of the legs of the stators is equal and the output of the pickoff rotor coils is zero because the net flux is zero. However, when the pickoff rotor coils are angularly displaced in response to angular displacement of the gyro wheel case 35, each pickoff rotor coil couples one of the pickoff legs adjacent thereto more than the other so that the pickoff rotor coils produce an output proportional to the angular displacement of the gyro wheel case 35.

With this construction, each of the pickoffs 68 and 70 can be independently adjusted by the adjusting screws 86 and 88 to enable an optimum null position to be easily obtained. By connecting the two pickoff rotor coils together in series, the output can be increased, and if desired, more than two sets of coils can be utilized to increase the output from the pickoff. It is also apparent that a reduced output could be obtained by using only one pickoff stator and pickoff rotor coil, rather than the two sets as illustrated. When a plurality of pickoffs are utilized as illustrated, they can be connected in series or parallel with the parallel arrangement providing a reduced pickoff scale factor with reduced power consumption. As hereinafter explained, the series connection is preferable.

By relocating the pickoff stator coils and cores to the outside of the housing with the gyro flotation fluid, a strain-insensitive lamination material such as silicon iron (trancor T) may be employed for the stator cores to reduce mechanical strain sensitivity and the potting material normally employed to protect the lamination material from contamination by the flotation fluid can be eliminated. By alleviating the strain sensitivity problem in this manner, null shifts with temperature gradients are minimized, and if a stator should fail, it can be replaced without disassembling the gyro. Further, this location of the pickoffs enables less flotation fluid to be employed which reduced the weight of the gyro and increases its temperature range.

The torquers and pickoffs must provide maximum stability of fixed torque restraint through air core secondaries. The pickoff assemblies are differential transformers and the torquers are permanent magnet devices operating as D'Arsonval galvanometers. The pickoff assemblies are therefore A-C devices whereas the torquers are D-C devices. Use can be made of this feature by having the same flexleads serve both the pickoff assemblies and torquers.

Thus, in addition to thin cylindrical wall 62, the cup-shaped rotor 60 also has a washer-shaped bottom wall 96. A washer-shaped metal plate 98 is fixed on the outside of the washer-shaped bottom wall 96 and acts as the support for four terminal posts 100, 102, 104, 106 fixed therein by insulated bushings 108 to insulate the terminals from the plate 98. A torquer coil 110 is imbedded partially in the bottom wall 96 and partially in the cylindrical wall 62 of the housing and a second torquer coil 112 is similarly imbedded in the housing in diametrically opposed relation to the torquer coil 110. The pair of pickoff stator coils 76 and 78 are imbedded in the housing in position to define a pair of orthogonal axes with torquer coils 110 and 112.

The torquer coils and the pickoff stator coils can be connected to the same terminal posts. The torquer coils 110 and 112 can be connected together in series between the terminal posts 100 and 104 and the pickoff stator coils 76 and 78 are then connected together in series between the terminal posts 102 and 106. A first capacitor 114 is connected between the terminal posts 102 and 104 and a second capacitor 116 between the terminal posts 100 and 106. With this arrangement, and in a closed loop operation, the pickoff output signal at a carrier frequency (typically 400 c.p.s., 3860 c.p.s., 6400 c.p.s., or 20,000 c.p.s.) is applied through the coupling capacitors to the terminal posts 100 and 104, and the direct current feedback for energizing the torquer coils 110 and 112 is applied to the same terminal posts 100 and 104. The coupling capacitors serve to isolate the torquer current from the pickoff circuit by removing the direct current from the pickoff coils. If the capacitor isolation were not employed, the D-C current in the pickoff circuit might degrade gyro torquer linearity since the pickoff coils are situated in the stray field of the torquer permanent magnet circuit.

With this arrangement, only two flexleads 118 and 120 need be connected to the terminal posts 100 and 104, thereby improving gyro reliability and performance by way of lower fixed restraint about the gyro output axis. In addition, the gyro application in a stable element or platform is enhanced because the number of slip rings per gimbal and associated cable leads and connector rings per platform is greatly reduced.

The circuit arrangement is susceptible to some modification and change. For example, in those applications not requiring maximum torque linearity, a direct connection may be substituted for the coupling capacitors 114 and 116. With this arrangement, the direct current feedback is also applied to the pickoff circuit which may degrade gyro torquer linearity but not enough to be objectionable for an application having less strict accuracy requirements.

Figure 2:
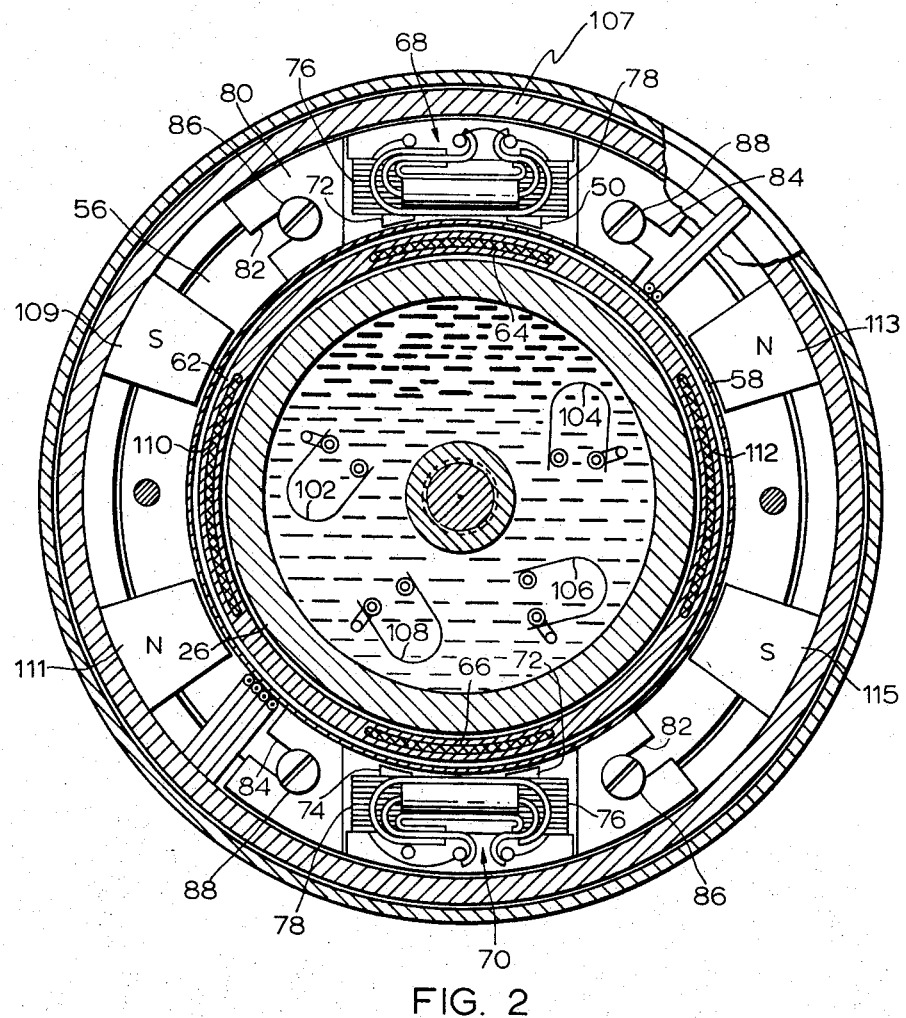
FIGURE 2 is a sectional view taken along the lines 2—2 of FIGURE 1.
Figure 4:
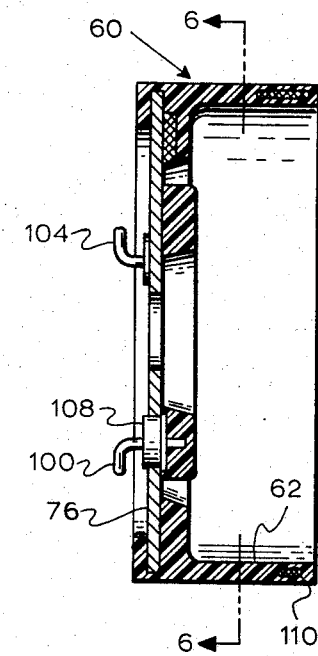
FIGURE 4 is a sectional view taken along the lines 4—4 of FIGURE 3.
Figure 3:
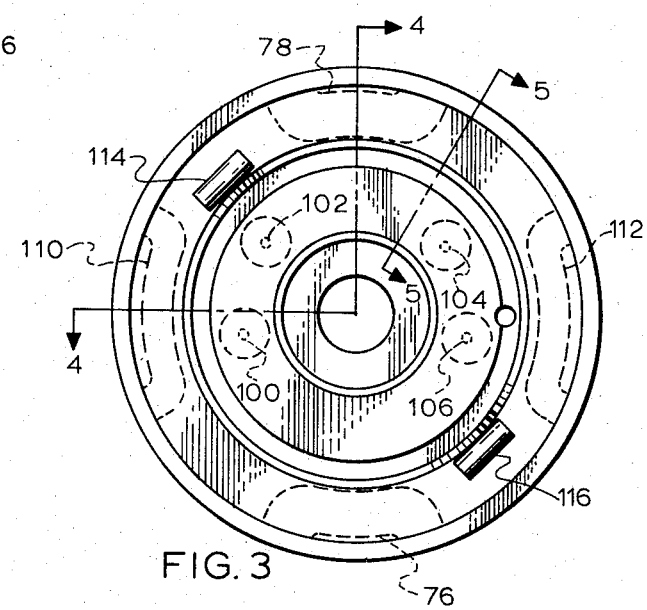
FIGURE 3 is a sectional view taken along the lines 3—3 of FIGURE 1.
Figure 5:
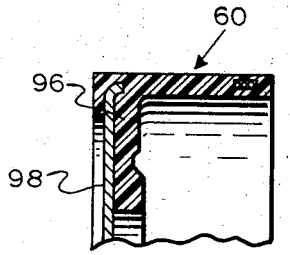
FIGURE 5 is a sectional view taken along the line 5—5 of FIGURE 3.
Figure 6:
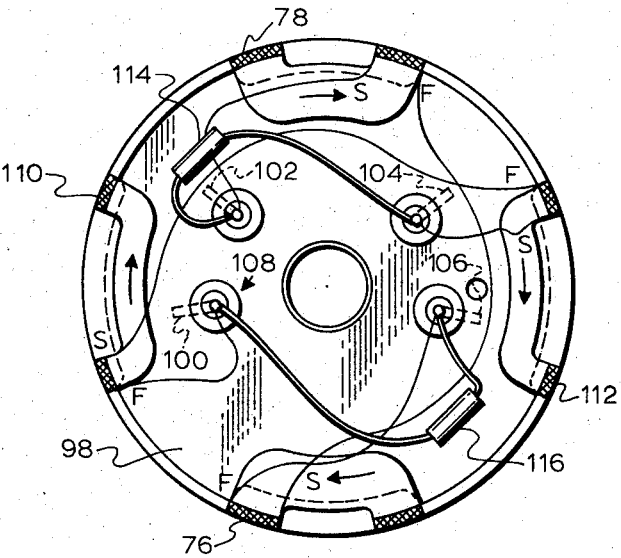
FIGURE 6 is a sectional view taken along the lines 6—6 of FIGURE 4.
Figure 7:
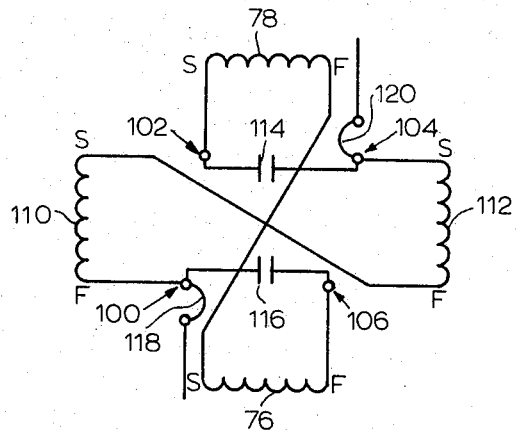
FIGURE 7 is a schematic diagram of the electrical circuit connecting the pickoff and torquer coils.
Figure 8:
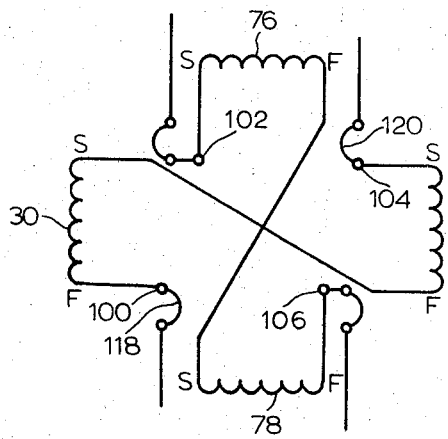
FIGURE 8 is a schematic diagram of another possible electrical circuit useful in connecting the pickoff and a torquer coils.
Figure 9:
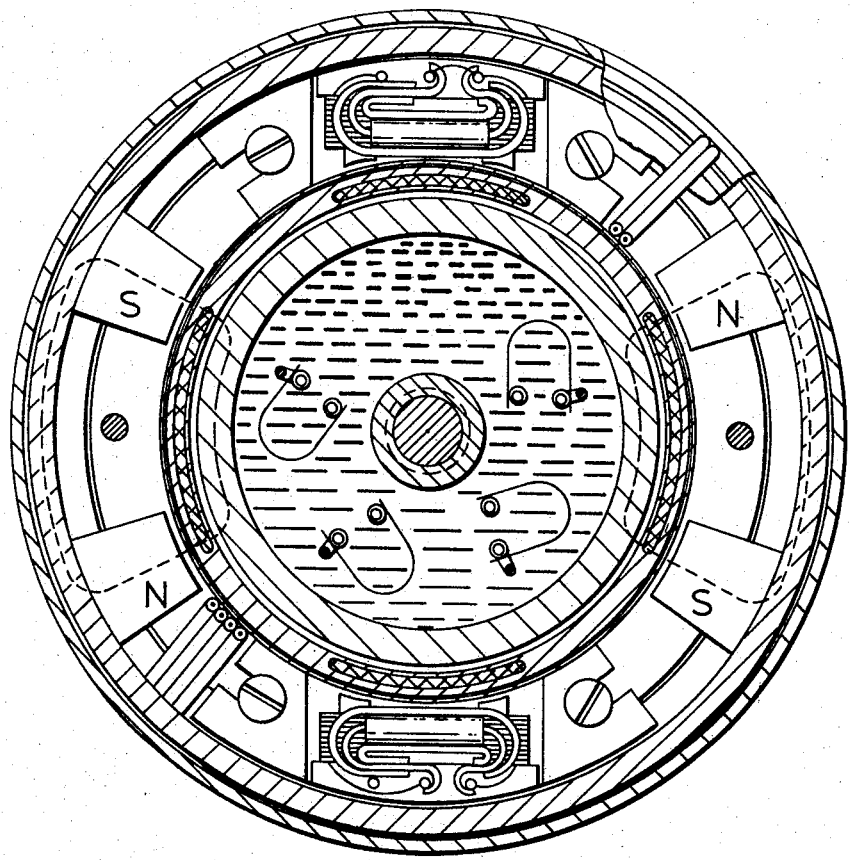
FIGURE 9 shows the magnetic flux pattern using the view depicted in FIGURE 2.

The advantages of the foregoing construction may best be understood by a study of FIGURE 9 which shows the same view as FIGURE 2, but without the part numbers and with the flux pattern lines added. Here, the two magnetic circuit flux paths are shown starting at one pole, e.g., the north pole, the flux path is along the outer magnetic return path to the south pole, and then along the inner return path to the north pole. The flexleads which are within the cup-shaped ring of the inner return path are shielded by the inner magnetic return path from the permanent magnet circuits, and so are the pickoff coils both on the rotor and stator as these are disposed outside the flux path. There is one more circuit of considerable importance and this is the magnetic field provided by the motor stator 37 and field windings 39. With the construction shown, the fields of the motor stator 37 do not interact with the permanent magnet fields shown in FIGURE 9 nor with the fields of the pickoffs. Particular attention must be given to the construction of rotor 60. This is an epoxy resin cup specially filtered to remove magnetic contamination. The filtering consists of dripping the epoxy resin when still in the liquid state through a plurality of magnetic air gaps formed by high flux density pole faces. The magnets remove the contaminating magnetic particles. In the construction of the gyro, beryllium is employed where required because of its low density, stiffness, and thermal characteristics. The motor assembly, having only four major parts, significantly increases gyro performance by providing greater mass stability about the output axis. Temperature coefficients of linear expansion for all floated parts are matched very closely, and thermal gradients have been reduced to preclude mass shifts resulting from differential expansion. The relatively small number of parts and large, easy-to-clean fluid gaps effectively achieve greater ease of fabrication and greater reliability over the life of the gyro. Simple "dual stops" prevent damage to the pivot-jewel bearing despite excessive inputs. The torquers and pickoffs are designed to provide maximum stability of fixed torque restraint. This is accomplished through the use of air core secondaries.

It will be observed therefore that the present invention provides for a gyro comprising, a cylindrical rotatable gyro case 25 with a gyro wheel mounted therein for rotation at right angles to the spin axis of the case; a fluid seal wall 58 enclosing said case within said fluid seal wall for movement with said case including pickoff rotor coils 64, 66; a ring-shaped stator mounted outside said fluid wall including pickoffs 68, 70 for detecting the position of said rotor and producing an output signal proportional to the angular displacement of the gyro. The rotor also includes a pair of torquer coils 110, 112 preferably orthogonally disposed with respect to pickoff rotor coils while the stator has two permanent magnet sets with two permanent magnets in each set, i.e., 109, 111; 113, 115. The magnets of each set are coupled by an outer magnetic return path 107, the magnetic circuit being completed across an inner magnetic return path 49. The torquer coils 110 and 112 are disposed in the rotor between the two magnets of each set. The pickoff rotor coils 64, 66 and the torquer coils are each connected in series. The series pickoff rotor coils and the series torquer coils are connected in parallel between first and second terminals, i.e., preferably the same terminals.

While there have been described what at present are believed to be the preferred embodiments of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. In a gyro, a rotor connected to the gyro for angular displacement therewith about the output axis thereof; a pickoff rotor coil mounted on said rotor for rotation therewith, the axis of said coil extending substantially perpendicularly through said output axis; a U-shaped laminated core mounted radially outwardly of said pickoff rotor coil with the legs thereof extending into close proximity with the coil, said legs acting as poles; a pickoff stator coil for generating an A-C magnetic flux in said core; a magnetic return path mounted radially inwardly of said pickoff rotor coil so that the pickoff rotor coil is positioned in the air gap between the poles of the core and the return path to intensify the flux linkage; and means for adjusting the position of said core to provide a null adjustment.

2. The invention as defined in claim 1, including a thin fluid seal wall enclosing said rotatable rotor coil and magnetic return path, a cylindrical stator surrounding said wall, there being a pair of cores and pickoff stator coils mounted thereon at diametrically opposed locations; a pair of pickoff rotor coils on the rotor, one opposite each of the two cores; a pair of torquer coils on said rotor orthogonally disposed with respect to the pickoff rotor coils; two magnet sets, each set having two magnets; and an outer return coupling the two magnets in each set.

3. A device as defined in claim 2, said pickoff rotor and stator coils constituting a pickoff assembly; first and second terminals; a pair of torquer coils connected in series between said terminals; and a pair of coils from the pickoff assembly connected together in series between said terminals and in parallel with said torquer coils whereby only two flexleads are required to connect the torquer coils and the coils from the pickoff assembly to an external circuit.

4. In a gyro, in combination, a rotatable member capable of rotation about at least one axis;
   a circular rotor connected to one end of said member for rotation therewith;
   fluid seal means at said one end around said rotor and said member;
   a circular inner magnetic return path within said rotor surrounding and shielding electrical terminals therein;
   at least one each of torquer and pickoff rotor coils on said rotor, said torquer and pickoff rotor coils being in parallel and connected to the same terminals; and,
   a stator outside said fluid seal including pickoff stator cores and coils and magnet means opposite the pickoff rotor coils and the torquer coils, respectively.

5. In a gyro as defined in claim 4, coupling capacitors in series with said pickoff rotor coils to prevent D-C torquer current from passing through said pickoff rotor coils.

6. In a gyro as defined in claim 5, a pair of arcuately disposed pickoff rotor coils and a pair of arcuately disposed torquer coils on said rotor defining two orthogonal axes; a pair of pickoff stator cores and coils disposed opposite the pickoff rotors; and two permanent magnet sets, each set having individual north and south pole magnets coupled by an outer return path coupling the poles of each set, each set being disposed so as to span the arc of the arcuately disposed torquer coils.

7. A gyro comprising in combination,
   a cylindrical housing;
   a rotatable member fitted for rotation in said housing at least about the housing cylindrical axis;
   a circular rotor connected for rotation to said member towards one end of said housing;
   an end cover including a cylindrical wall at said housing, one end providing a fluid seal for said rotor and said member;
   a support axially disposed in said rotor and electrical terminals therein;

a circular inner magnetic return path surrounding and shielding the electrical terminals within said support;

a pair of arcuately disposed pickoff rotor coils and a pair of arcuately disposed torquer coils on said rotor defining two orthogonal axes, each pair being connected in series, both pairs being in parallel between the same electrical terminals, coupling capacitor means in series with said pickoff rotor coils to prevent the flow of D-C torquer current therethrough;

a stator outside said fluid seal including a pair of pickoff stator cores and coils disposed opposite the pickoff rotor coils; and two permanent magnet sets, each set having individual north and south pole magnets and an outer return path coupling the poles of each set, each set being disposed so as to span the arc of the arcuately disposed torquer coils.

8. A gyro as defined in claim 7, said pickoff stator cores and coils comprising a laminated core having spaced legs spanning the arc of the pickoff rotor coils; and pickoff stator coils wound about each leg, the pickoff stator coils being connected in phase opposition so that the magnetic flux is additive in each core.

9. A gyro as defined in claim 8, each core being supported on an arcuate base having slots in the ends thereof and screws adjustably fastening said base to said end cover.

10. A gyro as defined in claim 9, said outer return path being an outer ring between said housing and stator.

11. A gyro as defined in claim 10, including a plurality of easy-to-clean fluted passages in the housing around said rotatable member.

References Cited

UNITED STATES PATENTS

| | | | |
|---|---|---|---|
| 3,074,283 | 1/1963 | Quermann | 74—5.7 |
| 3,077,760 | 2/1963 | Packard | 74—5.4 X |
| 3,154,952 | 11/1964 | Cohen | 74—5 |
| 3,208,288 | 9/1965 | Cohen | 74—5.6 |

FRED C. MATTERN, JR., *Primary Examiner.*

PALMER W. SULLIVAN, C. J. HUSAR, *Examiners.*